United States Patent [19]

Marshall

[11] 4,306,582

[45] Dec. 22, 1981

[54] MIXING VALVE

[76] Inventor: Dennis Marshall, 1050 Elmendorf Dr., Lexington, Ky. 40502

[21] Appl. No.: 144,825

[22] Filed: Apr. 29, 1980

[51] Int. Cl.³ ............................................. F16K 11/22
[52] U.S. Cl. ................................. 137/100; 137/637.3; 137/637.5
[58] Field of Search .................... 137/98, 100, 625.17, 137/613, 614.19, 637.3, 637.5, DIG. 2

[56] References Cited

U.S. PATENT DOCUMENTS

| | | | |
|---|---|---|---|
| 2,647,529 | 8/1953 | Wall | 137/98 |
| 2,650,604 | 9/1953 | Barnett | 137/100 |
| 2,679,865 | 6/1954 | Griffith | 137/636.1 |
| 2,682,276 | 6/1954 | Fraser | 137/100 |
| 2,781,783 | 2/1957 | Ross | 137/636.4 |
| 2,928,422 | 3/1960 | Hunsinger | 137/597 |
| 2,980,141 | 4/1961 | Brinkman | 137/637.2 |
| 3,011,520 | 12/1961 | Barkelew | 137/625.17 |
| 3,099,996 | 8/1963 | Symmons | 137/98 |
| 3,448,755 | 6/1969 | Symmons | 137/100 |
| 3,626,966 | 12/1971 | Vanagas | 137/100 |
| 3,774,504 | 11/1973 | Bonney | 137/DIG. 2 |
| 4,033,370 | 7/1977 | Egli | 137/625.17 X |

Primary Examiner—William R. Cline
Attorney, Agent, or Firm—Spencer & Kaye

[57] ABSTRACT

A mixing valve which provides water of a constant temperature when connected to sources of hot and cold water. The valve comprises a cylindrical housing having first and second axially aligned spaced inlet connectors, a rotatable pressure selection element positioned within the housing, an axially translatable presure equalizing element positioned within the pressure selection element and a rotatable temperature selection element positioned within the pressure equalizing element. The pressure selection element has first and second ports substantially aligned with the inlet connectors to the housing, the pressure equalizing element has first and second ports axially aligned and angularly displaced from the first and second ports in the pressure selector and the temperature selection element has first and second ports angularly displaced with respect to each other and to the first and second ports in the pressure equalizing element. Rotation of the pressure selection element adjusts the volume of water discharged per unit time from the valve and rotation of the temperature selection element adjusts the ratio of hot to cold water discharged.

7 Claims, 6 Drawing Figures

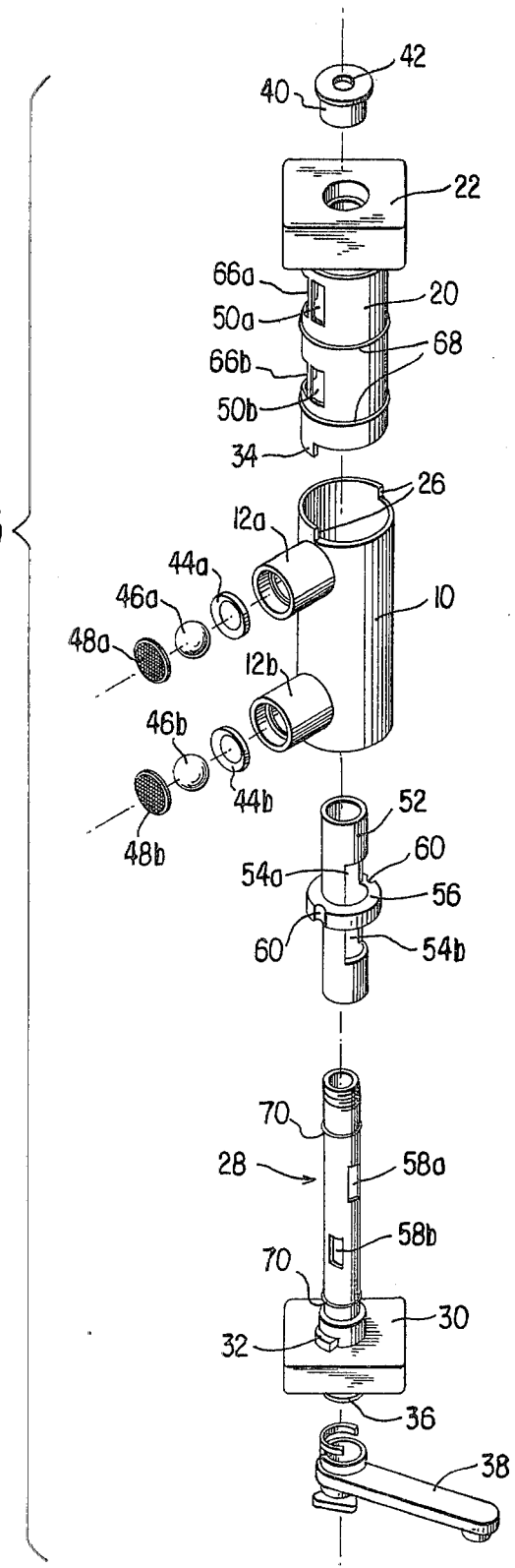

MIXING VALVE

BACKGROUND OF THE INVENTION

This invention relates to mixing valves and, in particular, to mixing valves for use with faucets.

Mixing valves are frequently used with kitchen and bathroom faucets to obtain water at a desired temperature and rate of flow from separate sources of hot and cold water. Rather than providing one valve for control of the volume of hot water delivered to a discharge outlet in a given period of time and a second valve for control of the flow of cold water to the outlet, a single mixing valve combines the hot and cold water to control both the temperature and the flow rate of the water at the discharge outlet. This may be accomplished by providing a first adjustment for controlling the ratio of the volume of hot to the volume of cold water delivered to the outlet per unit time, and a second adjustment for controlling the total volume of water released from the outlet during a given amount of time.

In the past, mixing valves have employed relatively complicated valve operating mechanism requiring the assembly of many parts. Although some prior art devices have separate handles for controlling volume of flow and temperature, others employ a single handle which controls both water temperature and volume. However, with a single handle device, the temperature of the water is often changed accidentally when adjusting the flow rate.

Summarizing, prior art mixing valve operating mechanisms often utilize a large number of assembled parts, and are relatively difficult to disassemble and repair. Further, with some of the devices commonly in use, it is easy to accidentally change the temperature setting when the volume of water is changed and, therefore, with each new use of the valve, the temperature must be readjusted. Thus, there is a need for a mixing valve of simple construction in which the temperature of the water does not change as the rate of flow is varied.

SUMMARY OF THE INVENTION

It is an object of the present invention to provide an improved fluid mixing valve which can be used to provide water of a desired temperature and rate of flow at the discharge outlet of a faucet.

It is another object of the invention to provide a mixing valve having a simple valve operating mechanism utilizing a minimum number of parts.

Still another object is to provide a mixing valve which can be easily disassembled for repair.

It is a further object of the invention to provide a mixing valve with a fluid ratio control that will permit the temperature of the water to remain constant as the flow rate is adjusted.

In accordance with the present invention, a mixing valve is provided which comprises a cylindrical housing having first and second axially aligned spaced inlet connectors coupled to first and second sources of fluid. Fluid blocking devices are located within each of the inlet connectors to prevent fluid from entering the valve when the valve is closed and permit the flow of fluid when a rotatable flow rate or pressure selection element is turned from its off position. The pressure selection element has first and second axially spaced ports which are substantially aligned with the first and second inlet connectors in the housing.

An axially translatable pressure equalizing element positioned within the coaxial with the pressure selection element has first and second axially spaced ports which are angularly displaced, preferably at 180°, with respect to the first and second ports of the pressure selection element. An external flange forming part of the pressure equalizing element is interposed between its first and second ports.

A rotatable cylindrical temperature selection element is positioned within and coaxial with the pressure equalizing element. The temperature selection element has first and second axially spaced ports which are angularly displaced with respect to the first and second ports in the pressure equalizing element. With this configuration, the ratio of the fluids from the first and second sources is controlled by the angular displacement of the temperature selection element with respect to the ports in the pressure equalizing element. Water at a desired temperature and rate of flow is delivered from an end of the temperature selection element.

BRIEF DESCRIPTION OF THE DRAWINGS

FIG. 6 is an exploded view showing the components comprising the valve.

DESCRIPTION OF THE PREFERRED EMBODIMENTS

Figure 5:
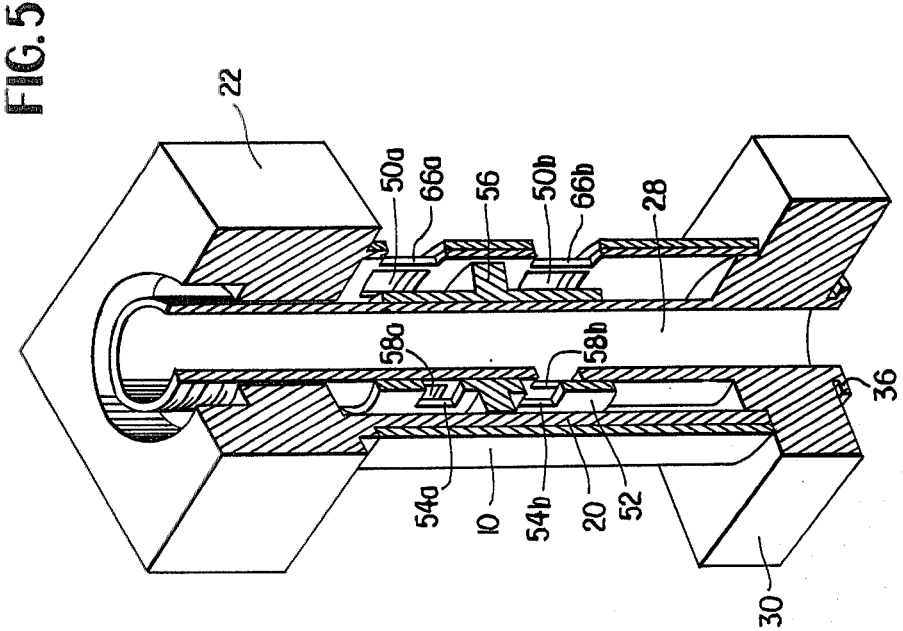
FIG. 5 is a perspective cutaway view of the mixing valve.
Figure 1:
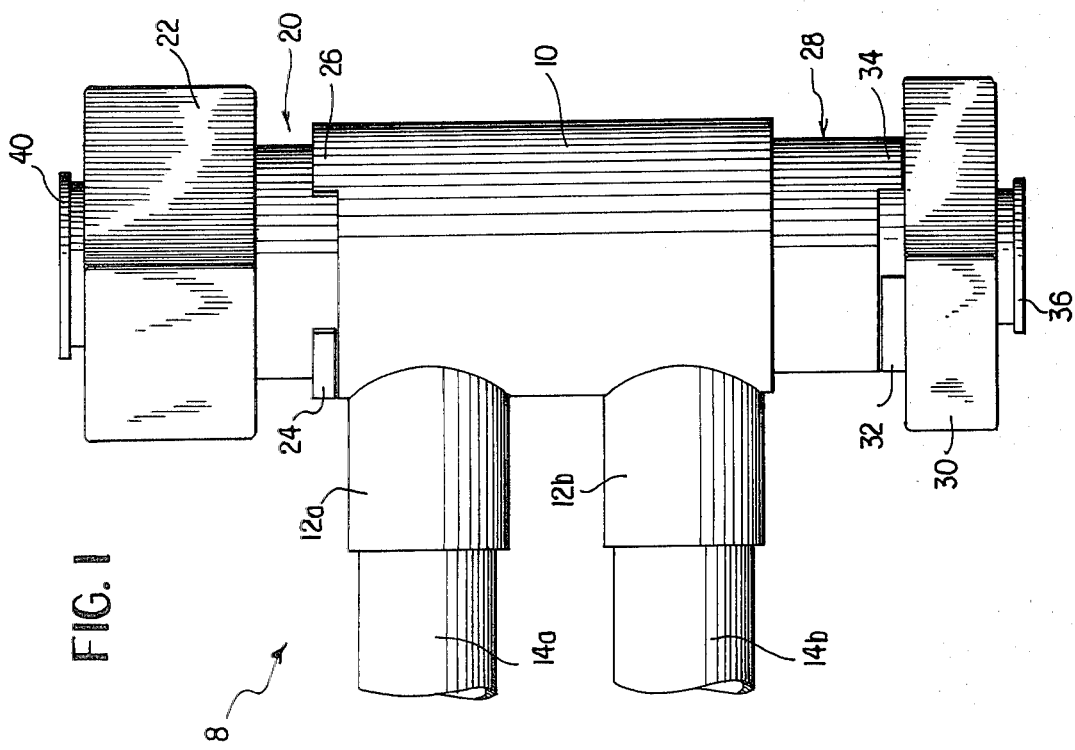
FIG. 1 is an external view of the mixing valve of the present invention.

Referring to FIG. 1, there is shown the mixing valve 8 of this invention which comprises a cylindrically shaped housing 10 coupled through an inlet connector 12a to a pipe 14a which carries hot water to the valve. An inlet connector 12b couples the housing 10 to a pipe 14b which supplies cold water to the valve.

Located within the housing 10 is a cylindrically-shaped rotatable pressure selection element 20. The pressure selector 20 is rotated within the housing by turning handle 22 affixed to its upper end. Rotation is limited by a stop 24 on the pressure selector and a stop 26 on the housing.

A cylindrically-shaped temperature selection element 28 is coaxially mounted within the pressure selector 22. The temperature selector 28 is rotatable by turning handle 30, the angle of rotation being limited by a stop 32 on the temperature selector and a stop 34 on the pressure selector. Water is discharged through a discharge outlet 36 at the lower end of the temperature selector 28. A spout 38, as shown in FIG. 6, may be threaded onto the nozzle discharge outlet. An internally threaded cap 40, provided with a centrally located opening 42 (FIG. 2), is attached to external threads on the upper end of the temperature selector 28, as shown in FIGS. 2 and 6.

Figure 2:
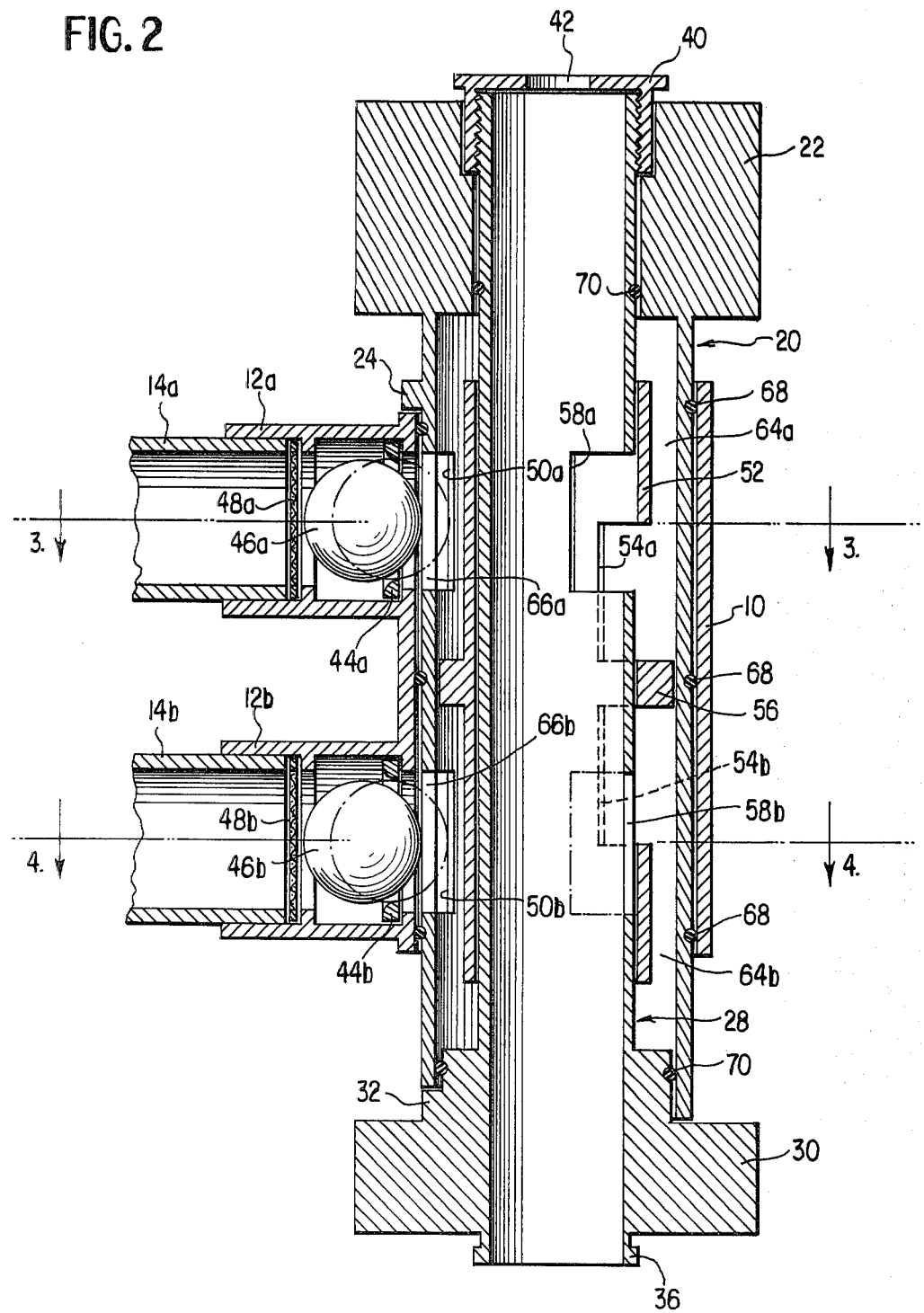
FIG. 2 is a cross-sectional view of the valve.

Referring to FIGS. 2 and 6 which show cross-section and exploded views respectively of the components of valve 8, fluid blocking assemblies consisting of ring seals 44a and 44b, spherical elements 46a and 46b and filter elements 48a and 48b are located within hot and cold water inlet connectors 12a and 12b respectively. The spherical elements 46a and 46b are driven by the pressure of the water in pipes 14a and 14b against ring seals 44a and 44b respectively thereby preventing water from entering the valve 8. Filters 48a and 48b, which are seated on flanges formed on the insides of the connectors 12a and 12b, prevent foreign matter from entering the valve.

The pressure selector 20 is provided with two spaced axially aligned ports 50a and 50b which are located opposite the openings in inlet connectors 12a and 12b respectively. Slidably positioned between the pressure selector 20 and the temperature selector 28 is a pressure equalization element 52 which is also cylindrically shaped. The pressure equalizer 52 is provided with two axially spaced, aligned ports 54a and 54b which are offset with respect to the openings in connectors 12a and 12b, respectively, by an angle of 180°. Ports 54a and 54b are separated by a pressure chamber separation ring or flange 56.

Figure 3:
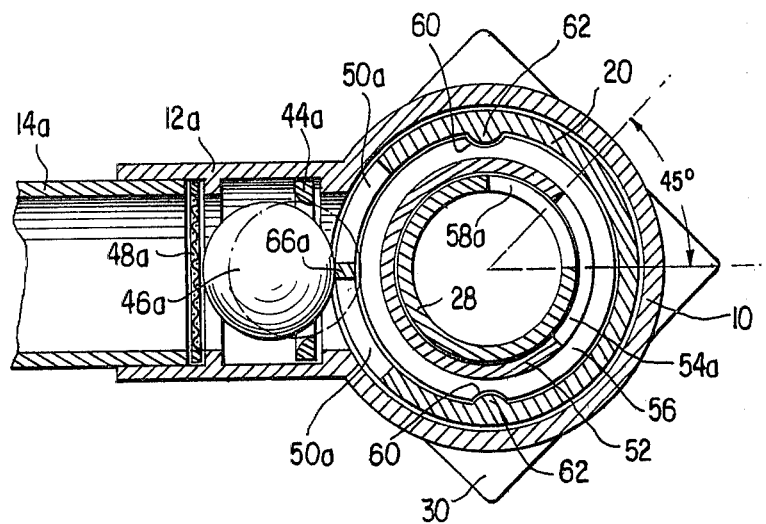
FIG. 3 is a section of the valve taken along the lines 3—3 in FIG. 2.
Figure 4:
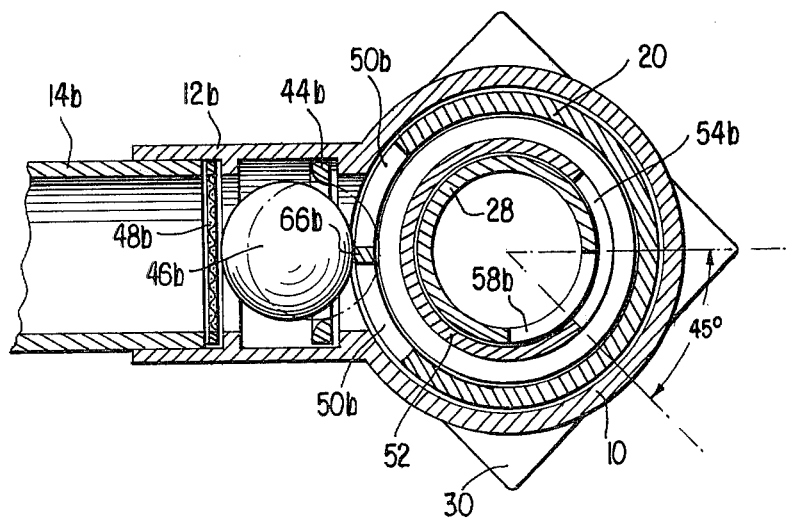
FIG. 4 is a cross sectional view of the valve taken along the lines 4—4 in FIG. 2.

Temperature selector 28 is provided with two axially spaced ports 58a and 58b. As shown in FIGS. 3 and 4, port 58a is angularly displaced counterclockwise from port 54a in pressure equalizer 52 by 45° and port 58b is angularly displaced clockwise by 45° from port 54b in the pressure equalizer.

Flange 56 is provided with two opposing notches 60 which are aligned with two guide ribs 62 running lengthwise on the inside wall of the pressure selector 20. Notches 60 and guide ribs 62 allow pressure equalizer 52 to translate along the axis of the valve 8 but do not permit it to rotate. An upper annular chamber 64a is formed in the space between the portion of pressure equalizer 52 above flange 56 and the pressure selector 20, and a lower annular chamber 64b is formed in the space between the portion of the pressure equalizer before the flange and the pressure selector.

Ports 50a and 50b of the pressure selector 20 are axially bisected by pins 66a and 66b, respectively. The pressure selector 20 fits tightly into the outer housing 10, three axially spaced o-rings 68 being interposed between the pressure selector and the housing to prevent leakage from the valve and provide bearing surfaces. Two axially spaced o-rings 70 are similarly interposed between the temperature selector 28 and the pressure equalizer 52.

In operation, hot water from pipe 14a and cold water from pipe 14b enter the valve 8 through inlet connectors 12a and 12b. When ports 50a and 50b of pressure selector 20 are aligned with inlet connectors 12a and 12b, the pressure of the water in pipes 14a and 14b forces spherical elements 46a and 46b against ring seals 44a and 44b preventing water from entering ports 50a and 50b. When the valve is "off" spherical elements 46a and 46b assume the positions shown in dashed lines FIGS. 2-4. As the pressure selector 20 is rotated away from the "off" position, the spheres 46a and 46b are identically forced away from the ring seals 44a and 44b by pins 66a and 66b. When this occurs, water from pipes 14a and 14b enters the valve 8 through ports 50a and 50b of the pressure selector 20.

Water entering ports 50a and 50b of pressure selector 20 builds up pressure in annular chambers 64a and 64b between the slidable pressure equalizer 52 and the pressure selector 20. The pressure is increased in these chambers because ports 50a, 50b of pressure selector 20 and ports 54a, 50b of pressure equalizer 52 are offset respectively by 180° and the water must travel around the pressure equalizer. When the pressures of the water from the hot and cold water sources are equal, the pressure equalization element 52 is balanced halfway between the pressure selector ports 50a and 50b. If pressure from one source decreases with respect to the other, the pressure equalizer slides along guide ribs 62 towards the port of lower pressure. This has the effect of allowing more water to enter the chamber of lower pressure and less water to enter the chamber of higher pressure. In this way, the ratio of hot to cold water delivered to the outlet tends to remain constant despite changes in the pressures of the water sources relative to each other.

As explained above, ports 54a and 54b of pressure equalizer 52 are axially aligned and offset by 180° with respect to the axially aligned ports 50a and 50b in the pressure selector 20. Ports 58a and 58b in the temperature selector 28 are also axially spaced but are offset by 45° with respect to the ports 54a and 54b in equalizer 52. Because of this relationship, rotation of temperature selector element 28 by turning handle 30 causes the alignment of ports 58a and 58b to change with respect to that of ports 54a and 54b to admit water only through port 58a (hot), only through port 58b (cold) or in any desired ratio of hot to cold water. The water flows through ports 50a and 50b of pressure selector 20, ports 54a and 54b of pressure equalizer 52, ports 58a and 58b of temperature selection element 28 and out through discharge outlet 36.

Thus, by adjusting handle 30, the desired water temperature is selected. Pressure equalizing element 52 keeps the water temperature relatively constant despite differences in the water pressures of the hot and cold sources. The volume of water flowing through the outlet in a given time is controlled by adjusting handle 22 of the pressure selector 20.

The four elements are held together by cap 40 which is attached to temperature selector 28 by a threaded connection. By blocking water flow through outlet 36, water can be diverted to the aperture 42 in cap 40 to provide a drinking fountain or an upwards rincing spray. If this feature is not desired, a solid cap can be used instead of one having an aperture.

The mixing valve of the present invention is advantageous in that the relationship between the pressure selection element and the temperature selection element remains constant as the pressure selection element is rotated. The temperature of the water thus remains constant as the water flow is adjusted. The temperature setting is changed by rotating the temperature selection element handle with one hand while holding the pressure selection element handle with the other hand to keep it from rotating. In this way, the relative positions of the two cylinders are changed. This arrangement eliminates the possibility of inadvertently changing the temperature when the flow is adjusted, and is a safety feature which reduces the possibility of accidental scalding.

The mixing valve is far simpler in design than prior art devices, being constructed essentially of four cylinders held together by a cap. The valve can be easily disassembled by the average user to replace parts, without need for special tools or the services of a plumber.

By attaching various connections to the top and bottom outlets, it is possible to adapt the valve for a variety of uses, such as for a bath-shower combination. The mixing valve of the present invention may also be used for other purposes requiring the controlled mixing of two fluids.

It will be understood that the above description of the present invention is susceptible to various modifications, changes and adaptations, and the same are intended to be comprehended withing the meaning and range of equivalents of the appended claims.

What is claimed is:

1. A mixing valve for mixing fluids emanating from first and second sources, comprising
    a cylindrical housing having first and second axially aligned spaced inlet connectors for coupling to said first and second sources respectively, each of said first and second inlet connectors being provided with fluid blocking means for impeding the flow of fluid therethrough;
    a rotatable pressure selection element positioned within said housing, said pressure selection element having first and second axially spaced ports substantially aligned with said first and second inlet members, rotation of said pressure selection element displacing said fluid blocking means to permit fluid from said first and second sources to enter the first and second ports of said pressure selection element;
    an axially translatable pressure equalizing element positioned within said pressure selection element, said pressure equalizing element having first and second axially aligned spaced ports angularly displaced from the first and second ports of said pressure selection element, a flange being interposed between the first and second ports of said pressure equalizing element;
    a rotatable temperature selection element positioned within said pressure equalizing element and having first and second axially spaced ports, said first and second ports being angularly displaced with respect to each other and to the first and second ports respectively in said pressure equalizing element; and
    fluid discharge means coupled to said temperature selection element, the fluid emanating from said discharge means having a volume per unit time determined by the angular displacement of said pressure selection element and a temperature determined by the angular displacement of said temperature selection element.

2. A mixing valve as defined by claim 1 wherein the angular displacement of the first port of said temperature selection element is approximately 45° counterclockwise from the first port of said pressure equalizing element and the angular displacement of the second port of said temperature selection element is approximately 45° clockwise from the second port of said pressure equalizing element.

3. A mixing valve as defined by claim 1 wherein said fluid blocking means comprise first and second spherical elements, said spherical elements nesting withing the first and second ports respectively of said pressure selection element when said valve is shut off and being identically displaced from said nesting position when said pressure selection element is rotated.

4. A mixing valve as defined by claim 1 wherein the ports in said pressure equalizing element are angularly displaced 180° from the angular position of the inlet members in said outer housing.

5. A mixing valve as defined in claim 1 wherein said fluid discharge means comprises a spout secured to one end of said temperature selection element.

6. A mixing valve as defined in claim 5 which further comprises a cap insertable in said pressure selection element and threadably engaged with the other end of said temperature selection element, said cap securing said pressure selection, pressure equalizing and temperature selection elements in alignment.

7. A mixing valve as defined in claim 6 wherein an aperture is provided in said cap, fluid being ejected through said aperture when it is prevented from being released through said spout.

* * * * *